(12) United States Patent
Weibezahn

(10) Patent No.: US 8,757,232 B2
(45) Date of Patent: Jun. 24, 2014

(54) METHOD AND SYSTEM FOR MONITORING AND CHANGING AIR PRESSURE IN A ROTATING WHEEL

(76) Inventor: Brandt Austin Weibezahn, San Ramon, CA (US)

( * ) Notice: Subject to any disclaimer, the term of this patent is extended or adjusted under 35 U.S.C. 154(b) by 537 days.

(21) Appl. No.: 13/065,564

(22) Filed: Mar. 24, 2011

(65) Prior Publication Data

US 2011/0232817 A1 Sep. 29, 2011

Related U.S. Application Data

(60) Provisional application No. 61/317,574, filed on Mar. 25, 2010.

(51) Int. Cl.
*B60C 23/10* (2006.01)
(52) U.S. Cl.
USPC .......................................... 152/417; 152/415
(58) Field of Classification Search
USPC ........................... 152/415, 416, 417; 280/201
See application file for complete search history.

(56) References Cited

U.S. PATENT DOCUMENTS

| | | | | |
|---|---|---|---|---|
| 631,773 | A * | 8/1899 | Bubb | 280/201 |
| 1,794,900 | A * | 3/1931 | Hutchinson | 152/417 |
| 1,796,482 | A * | 3/1931 | Schmidt | 152/416 |
| 2,107,405 | A * | 2/1938 | Williams | 152/417 |
| 2,634,782 | A | 4/1953 | Turek et al. | |
| 2,693,841 | A | 11/1954 | Webster, Jr. | |
| 4,470,506 | A | 9/1984 | Goodell et al. | |
| 4,498,515 | A * | 2/1985 | Holtzhauser et al. | 152/417 |
| 4,619,303 | A | 10/1986 | Bryan et al. | |
| 4,754,792 | A | 7/1988 | Braun et al. | |
| 5,143,390 | A * | 9/1992 | Goldsmith | 280/201 |
| 5,174,839 | A * | 12/1992 | Schultz et al. | 152/415 |
| 5,313,995 | A | 5/1994 | Schultz | |
| 5,318,317 | A * | 6/1994 | Hopper | 280/201 |
| 5,342,177 | A * | 8/1994 | Cheng | 417/233 |
| 5,383,716 | A | 1/1995 | Stewart et al. | |
| 5,397,144 | A * | 3/1995 | Mirand et al. | 280/201 |
| 5,860,660 | A * | 1/1999 | Garcia | 280/201 |
| 6,227,810 | B1 * | 5/2001 | Huang et al. | 417/63 |
| 6,575,269 | B1 | 6/2003 | Skoff et al. | |
| 7,581,576 | B2 * | 9/2009 | Nakano | 152/421 |
| 7,997,317 | B2 * | 8/2011 | Manning | 152/421 |
| 2008/0308206 | A1 | 12/2008 | Okada | |
| 2009/0084481 | A1 * | 4/2009 | Kalavitz | 152/417 |
| 2009/0096184 | A1 * | 4/2009 | Krudenscheidt | 280/201 |
| 2009/0311112 | A1 | 12/2009 | Isono | |

FOREIGN PATENT DOCUMENTS

DE 4225103 A1 * 2/1994
WO WO 2004065143 A1 * 8/2004

* cited by examiner

*Primary Examiner* — Kip T Kotter
(74) *Attorney, Agent, or Firm* — Gerald R Prettyman

(57) ABSTRACT

Systems for monitoring and adjusting the air pressure in a rotating wheel in air-tight connection with a non-rotating axle. In one embodiment, a non-rotating tank air pressure system is separated from a wheel air pressure system by a fill-purge valve. Manipulating the fill-purge valve changes the air pressure in the wheel air pressure system, while the wheel may be rotating, and the change in air pressure is monitored by a gauge.

16 Claims, 10 Drawing Sheets

METHOD AND SYSTEM FOR MONITORING AND CHANGING AIR PRESSURE IN A ROTATING WHEEL

CROSS REFERENCE TO RELATED APPLICATION

This non-provisional application claims the benefit of, and priority to, previously-filed U.S. provisional patent application No. 61/317,574 filed Mar. 25, 2010.

BACKGROUND OF THE INVENTION

1. Field of the Invention

The invention relates to devices and methods for monitoring and changing the air pressure in a rotating wheel that is attached to a non-rotating axle. In one embodiment, the invention allows bicycle riders to monitor and adjust the air pressure in bicycle wheels while riding the bike.

2. Description of the Related Art

Under certain situations, it may be desirable to monitor and change the air pressure in wheels. As a non-limiting example, bicycle or motorcycle riders may wish to adjust the air pressure in a rotating wheel, while riding. For example, a higher air pressure creates less friction between a bicycle or motorcycle and the terrain it traverses. And, a lower wheel tube air pressure creates more friction and more rolling resistance. Increased friction may be helpful when navigating a bicycle through rocks, sand, gravel, mud, snow, and ice or in any situation where more traction is desired.

Currently existing systems require the rider to dismount from the bike, open the tire valve stem, and adjust the tire pressure by either releasing or adding air. The ability to monitor and adjust tire pressure while remaining on the bicycle, motorcycle or other vehicle can enhance the riding experience.

BRIEF SUMMARY OF THE INVENTION

The invention is not limited to bicycles, motorcycles, or other vehicles with two-wheels. Other embodiments may have any number of wheels, as long as there is at least one rotating wheel.

In one embodiment of invention, a compressed gas tank 20 is connected with a bicycle with at least two wheels 11. Air supply tubing 25 runs from the compressed air tank 20 to at least one fill-purge valve 22. The fill-purge valve 22 is connected with air supply tubing 25 that runs to a hollow axle 30. To increase tire pressure, the rider manipulates the fill-purge valve 22 to the "fill" position, and air flows from the higher pressure compressed air tank 20, through the wheel air passageway, to the wheel tire 11. To decrease tire pressure, the rider manipulates the fill-purge valve to the "purge" position, and air bleeds from the wheel tire 11 to the atmosphere. If the rider does not manipulate the fill-purge valve 22, the air pressure in the wheel tire 11 remains constant.

A pressure gauge 23 is located between the fill-purge valve 22 and the wheel tire 11, to monitor the air pressure within the wheel air pressure system.

An air-tight connection between the fill-purge valve 22 and the wheel tire 11 forms the wheel air passageway. This passageway runs through air supply tubing 25 to the wheel axle, through the wheel axle to the hub (40, FIG. 4) and from the hub to the wheel tire 11.

It is standard for a rotating wheel to be connected to a vehicle by a non-rotating axle 30. The present invention creates an air-tight connection between a rotating hub and wheel assembly and a non-rotating axle and axle assembly, while still allowing the wheel to spin easily.

BRIEF DESCRIPTION OF THE SEVERAL VIEWS

Figure 3:
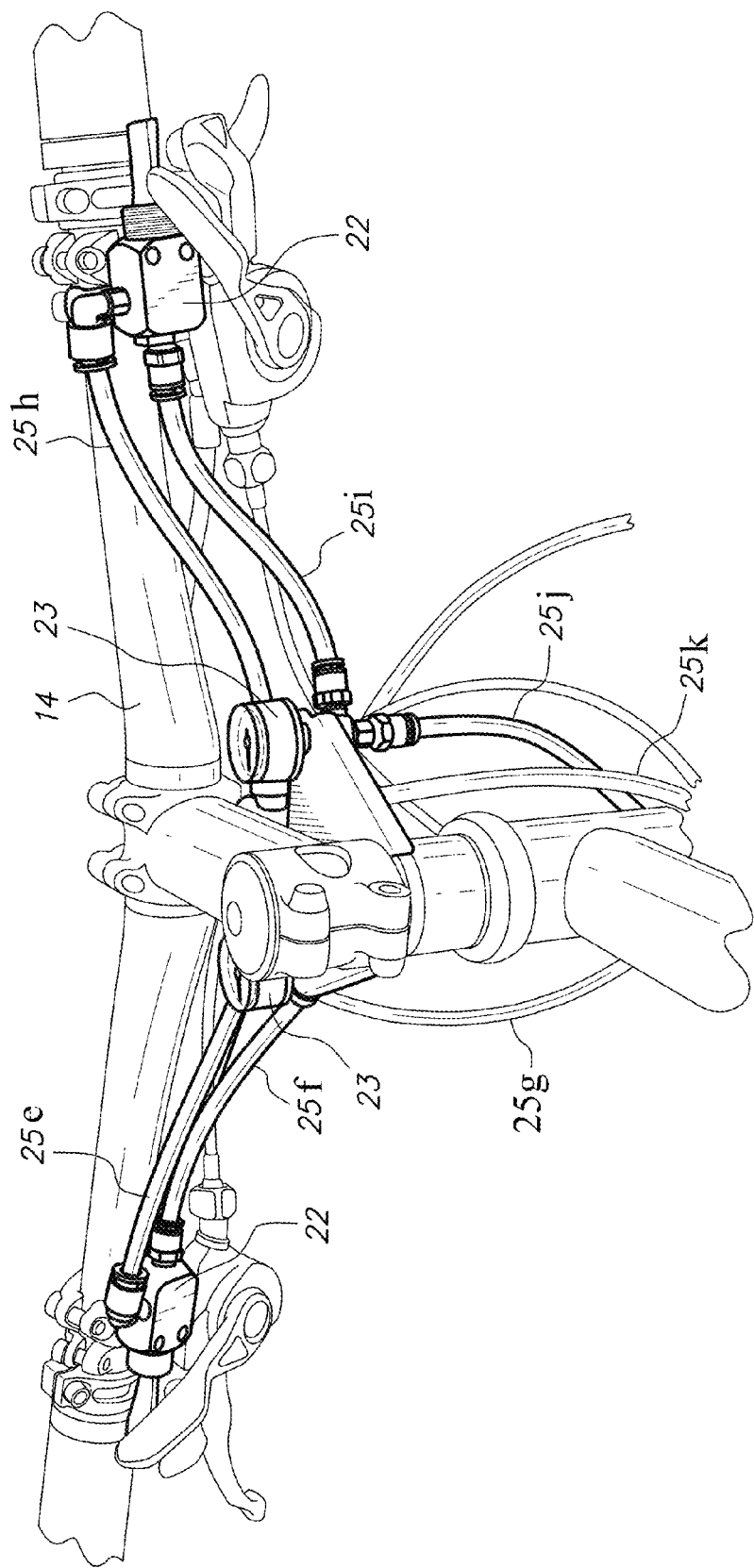

FIG. 3 a close-up perspective view of one embodiment of the air supply tubing, gauges and fill-purge valves, connected with a partial view of the handlebars of a bicycle frame.

Figure 4:
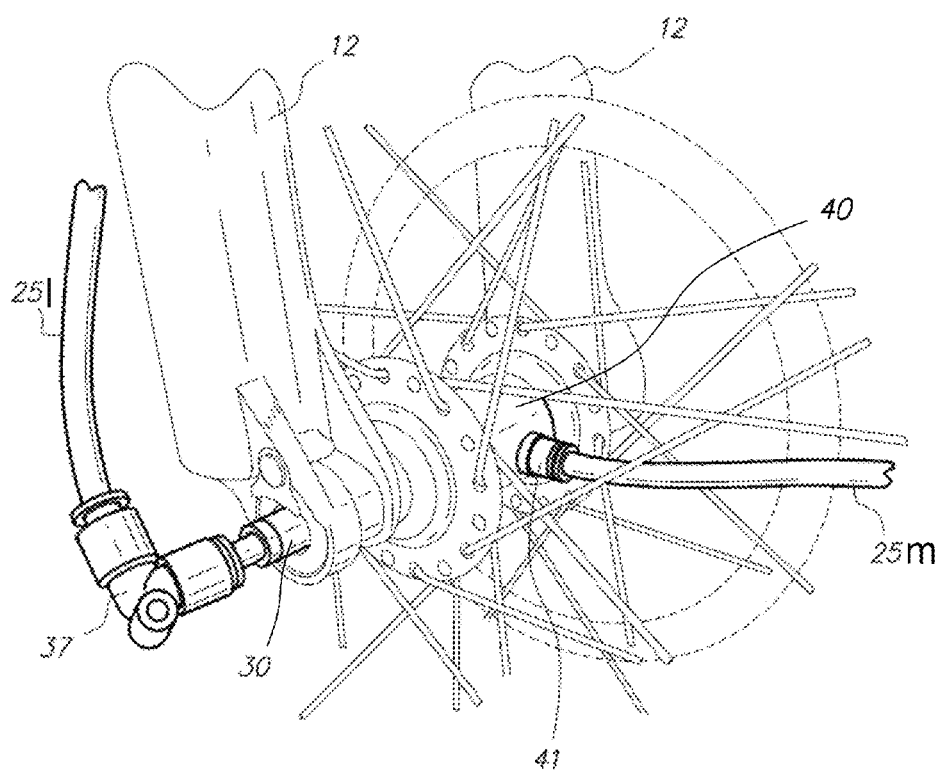

FIG. 4 is a close-up perspective view of one embodiment of the air supply tubing, axle, and hub, connected with a partial view of bike forks.

Figure 5:
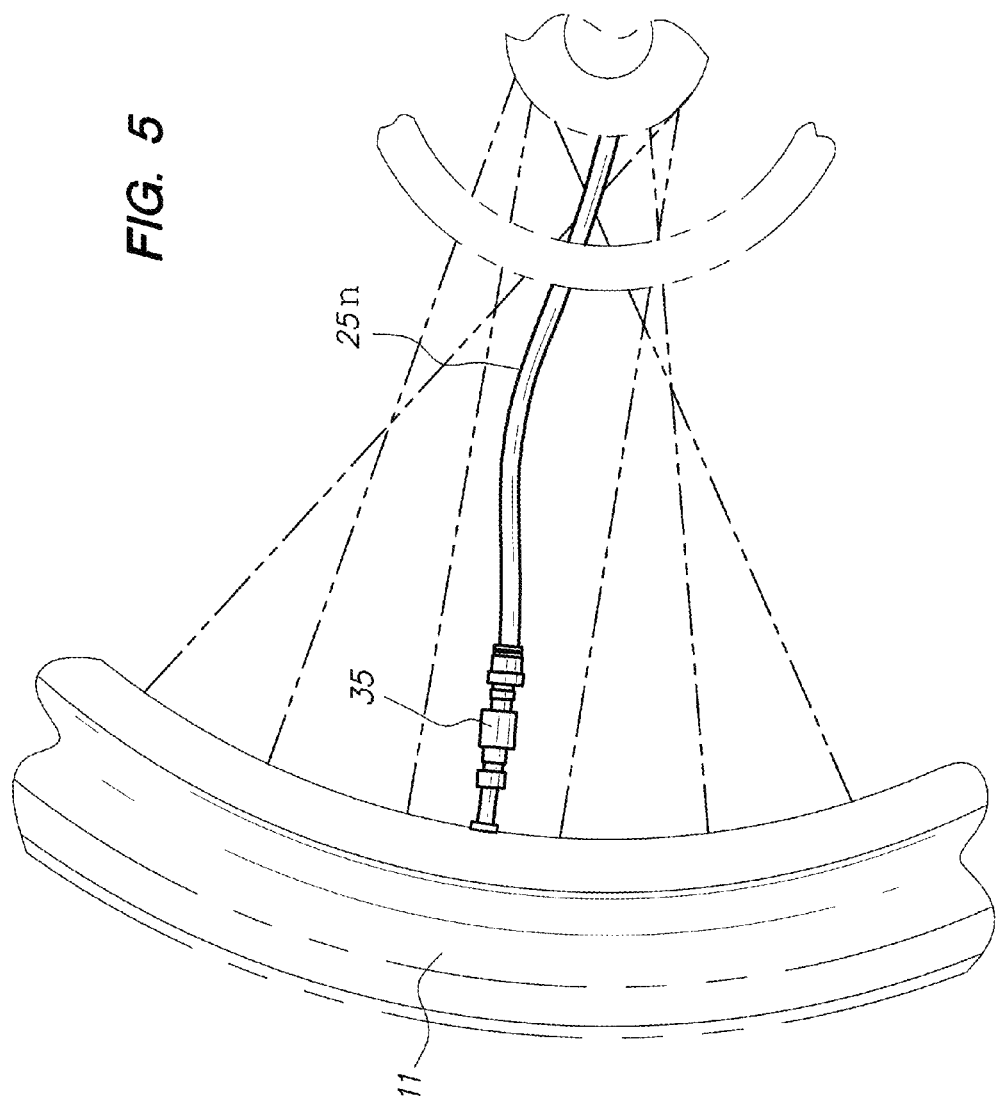

FIG. 5 is a close up partial side view of a wheel and one embodiment of air supply tubing connected with an open-close valve that is connected with a wheel.

Figure 6:
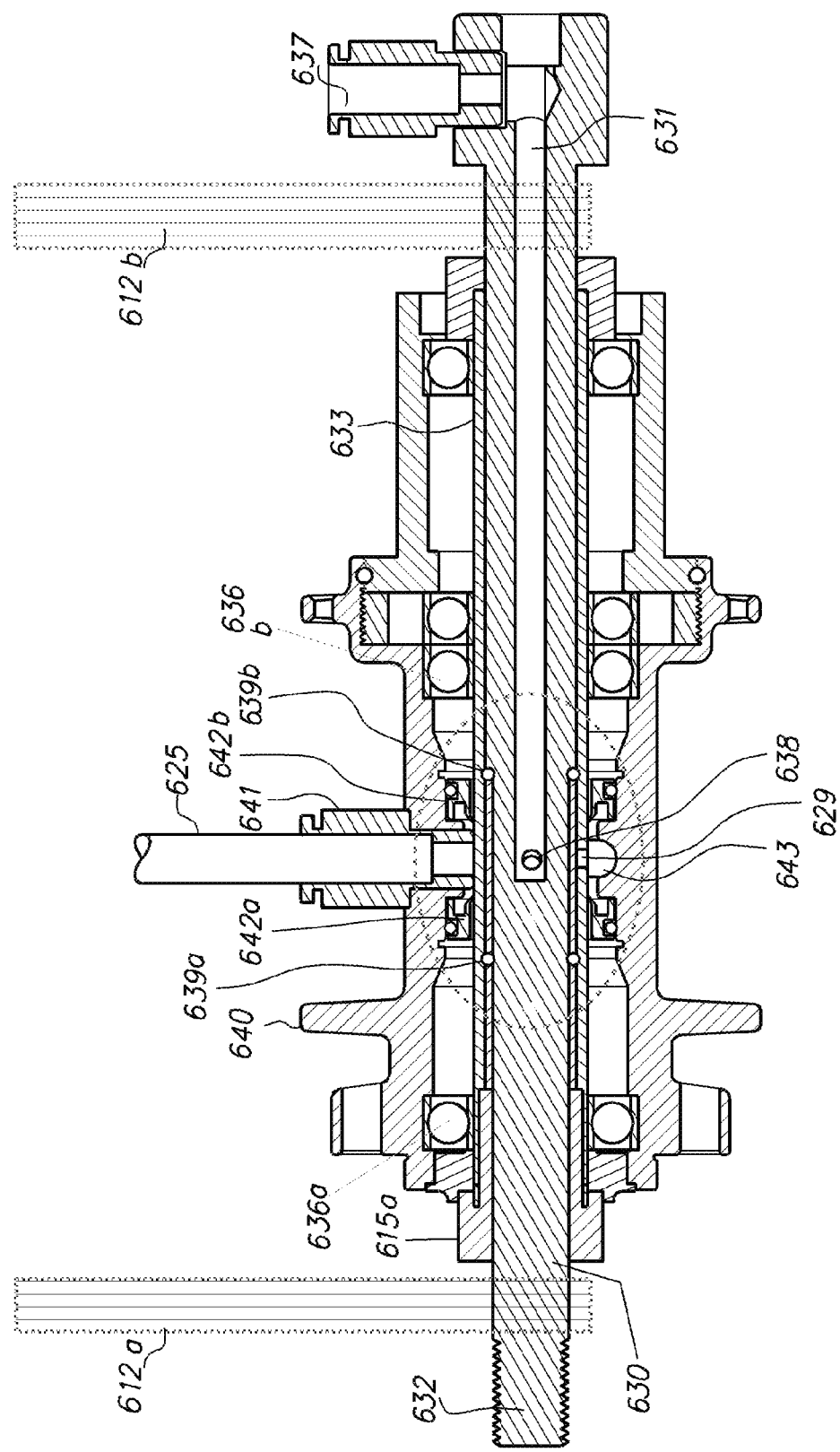

FIG. 6 is a cross-sectional view of a first embodiment of a hub, with a hollow axle, axle sheath, and seals, showing the wheel air passageway.

Figure 7:
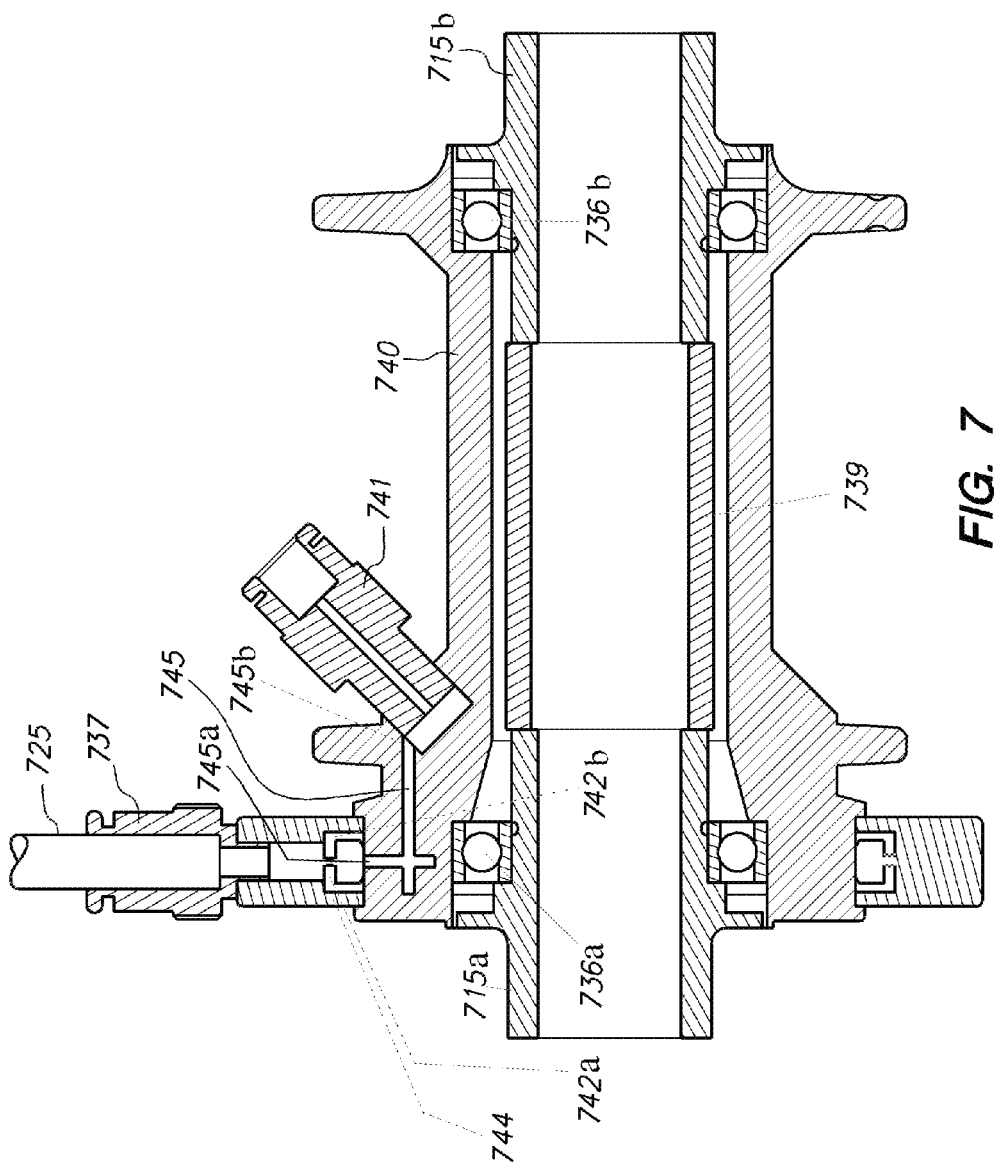

FIG. 7 is a cross-sectional view of a second embodiment of a hub, with a dynamic seal gland, showing the wheel air passageway.

Figure 8:
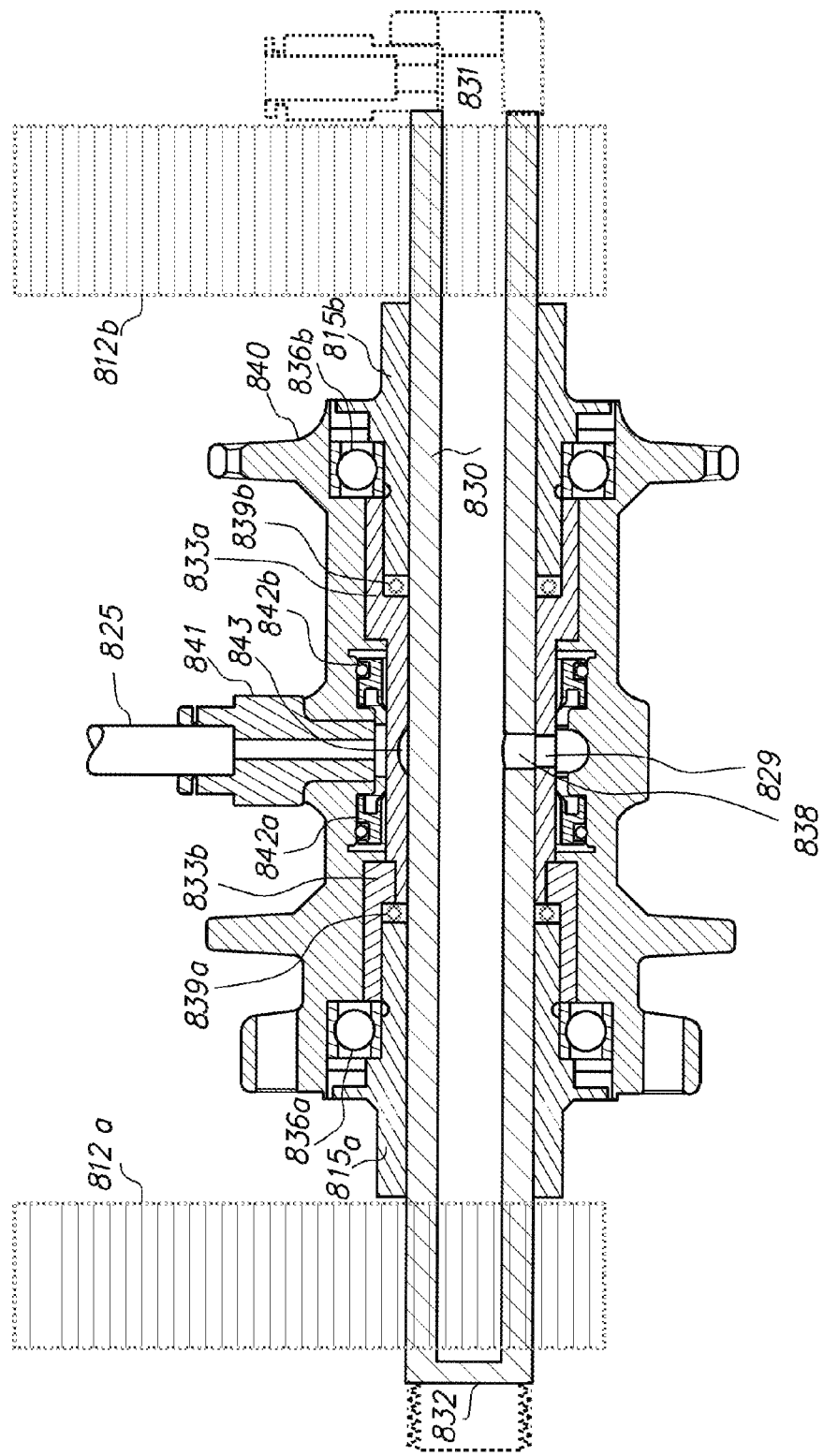

FIG. 8 is a cross-sectional view of a third embodiment of a hub, with a hollow axle, axle sheath, and seals, showing the wheel air passageway.

Figure 9:
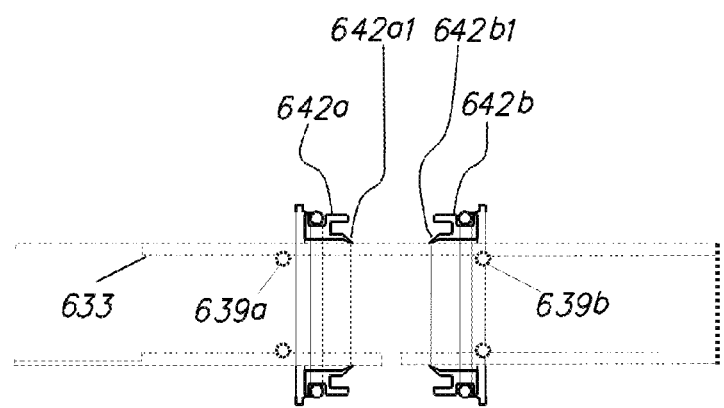

FIG. 9 is a cut-away cross-sectional view from FIG. 6 showing the at least two dynamic seals and the axle sheath without the hub or the hollow axle to identify the inner circumference sealing feature of the at least two dynamic seals on the outer circumference of the axle sheath.

Figure 10:
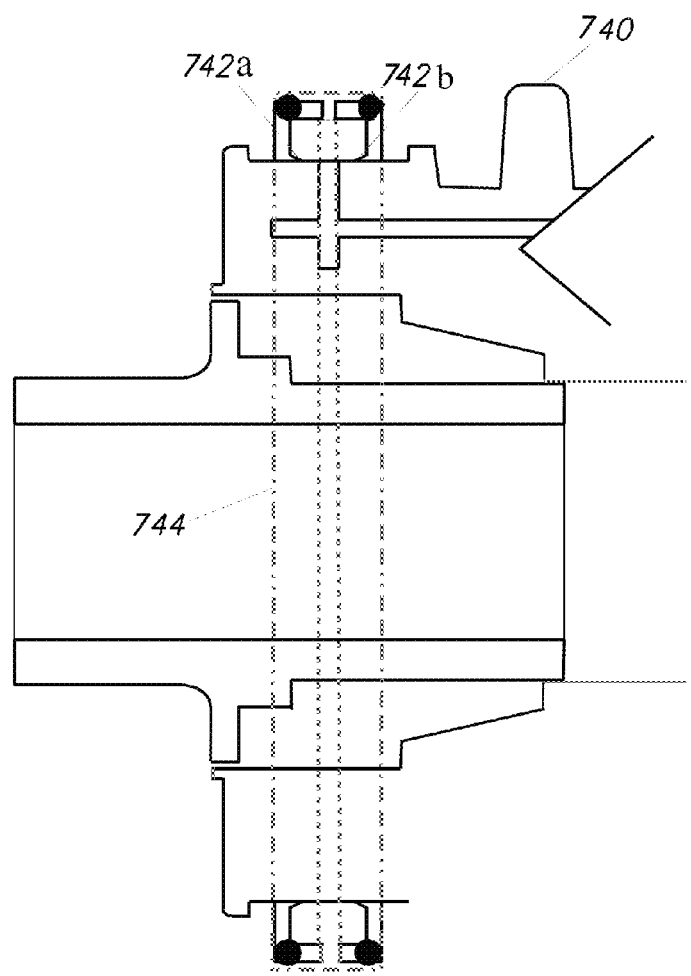

FIG. 10 is added as a blow-up view from cross-sectional FIG. 7 showing the dynamic seal gland and the at least two dynamic seals each with an inner lip on the outer circumference of the hub with one of the at least one adapters.

DETAILED DESCRIPTION OF THE INVENTION

The invention is a system for monitoring and adjusting the wheel air pressure in a rotating wheel, and includes a wheel air pressure system, inside a wheel air passageway. The wheel air pressure system and passageway are connected with and include the wheel tire 11, or wheel tube if a tube is used. The pressure in the wheel air pressure system is the pressure in the wheel tire.

The air tank pressure system includes a compressed air tank 20 and air supply tubing 25 running to a fill-purge valve 22. The compressed air tank 20 may be any device that supplies air at higher than atmospheric pressure. For purposes of this specification, "air" and "gas" mean any compressed gas whether or not the media remains in gas form when compressed. For example, compressed carbon dioxide is in liquid form in a pressurized tank, and becomes gas as the pressure is lowered. As non-limiting examples, the compressed gas tank 20 may have compressed carbon dioxide, nitrogen or other gas. The air pressure in the air tank pressure system is higher than the air pressure in the wheel air pressure system. And, the wheel air pressure is higher than atmospheric pressure. Thus, air will flow between these air pressure systems, as required by the laws of physics.

Figure 2:
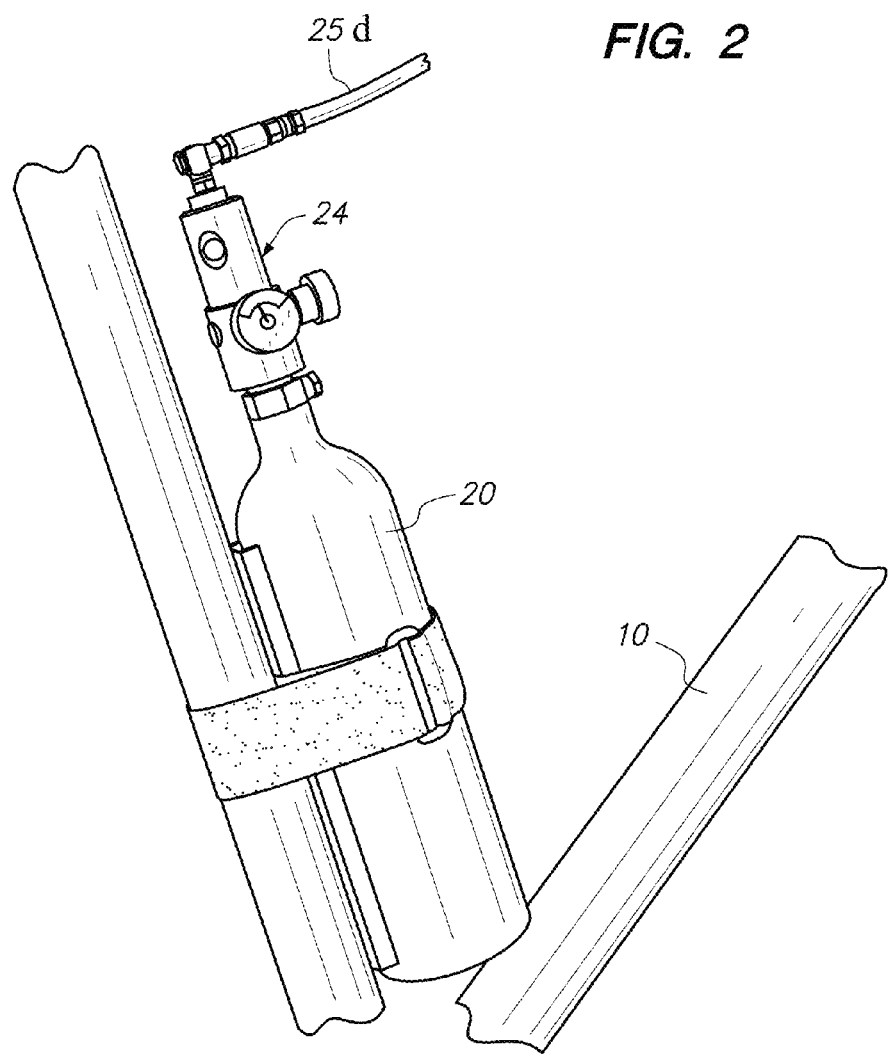
FIG. 2 is a side view of one embodiment of the air tank, connected with a partial side view of a bicycle frame.

Referring now to FIG. 2, in one embodiment, the compressed gas tank 20 may be removeably connected with the vehicle. Or, in another embodiment, the compressed gas tank 20 may be part of the bicycle tubing that creates the bike frame 10.

In one embodiment, the compressed gas tank 20 is connected with a regulator 24, to provide for a controlled transfer of gas from inside the compressed gas tank 20 to the air supply tubing 25.

The wheel air passageway comprises the air supply tubing 25, fittings, connections, o-rings, dynamic seals, and all other rotating and non-rotating parts that maintain the air-tight connection between the fill-purge valve 22 and the wheel tire 11. It is through this wheel air passageway that air flows between the fill-purge valve 22 and the wheel tire tube, to increase the wheel tire pressure; and from the wheel air pressure system to the atmosphere, to decrease the wheel tire pressure.

The wheel air pressure system is maintained by air-tight connections though the wheel air passageway. "Air-tight" as used in this specification, means sufficiently capable of separating the wheel air passageway from the atmosphere, while maintaining pressure in the wheel air pressure system, so that the system does not deflate during the course of a bike ride. The system may lose air over longer periods of time, resulting in a decrease in air pressure, and still be considered "air-tight" for purposes of this specification.

The air-tight connection is maintained through all parts of the wheel air passageway, including the connection between the rotating and non-rotating parts. In this specification, the rotating parts may be identified as the wheel assembly and the non-rotating parts may be identified as the axle assembly.

Various types of wheels are encompassed by the present invention. For example, bicycle wheels typically have a solid tire surrounding an inflatable tube. Car and motorcycle wheels typically have a solid tire that can be inflated. For purposes of this specification, "wheel tire" or "wheel tube" means an inflatable tire either with a tube, or without a tube as needed by the vehicle.

The Axle Assembly (FIGS. 6 and 8). All of these components of the axle assembly are non-rotating. The axle assembly includes: (1) the hollow axle (630, 830), with a hollow axle open end (631, 831) and a hollow axle closed end (632, 832), where said hollow axle open end (631, 831) may removeably connect with air supply tubing 25; (2) the annular axle sheath (633, 833), where the relative sizes of the hollow axle (630, 830) and the axle sheath (633, 833) are such that the outer circumference of the hollow axle (630, 830) is slightly smaller than the inner circumference of the axle sheath (633, 833), and thus the hollow axle (630, 830) may be inserted into the axle sheath (633, 833); (3) the inner race of at least two wheel bearings (636, 836); and (4) at least two static o-rings (639*a* and *b*, 839*a* and *b*).

The Wheel Assembly (FIGS. 4, 6, 7 and 8). All of the components of the wheel assembly are rotating. The wheel assembly includes: (1) the hub 40 (e.g., 40, 640, 740, 840), where the hub has a hub air-port (e.g., 41, 641, 741, 841) that is capable of connecting with air supply tubing 625 that runs to the wheel tire 11 (FIG. 5); (2) the outer race of at least two wheel bearings, (e.g., 636*a* and 636*b*, 736*a* and 736*b*, 836*a* and 836*b*,); (3) at least two dynamic seals (642*a* and 642*b*; 742*a* and 742*b*; and 842*a* and 842*b*); and (4) the wheel tire 11 (FIG. 5).

In the above-described embodiment, the at least two dynamic seals (e.g., 642*a* and 642*b*, etc.) and wheel bearings (e.g., 636*a* and 636*b*, etc.) are both used because they serve different functions. The wheel bearings (e.g., 636*a* and 636*b*) are standard technology, and contain a series of ball bearings encased inside solid, rotatable rings. Wheel bearings are typically made from steel because of the wheel bearings must bear significant weight and yet allow the encased ball bearings to easily move. It is not necessary to have wheel bearings as part of the air-tight wheel air pressure system. However, if the system will bear significant weight, it may be preferable to use wheel bearings to support weight, while allowing rotational movement.

Standard dynamic seals are not made to bear as much weight. Dynamic seals are used to create air-tight seals between rotating and non-rotating objects. In the present invention, the at least two dynamic seals (e.g., 642*a* and 642*b*; 742*a* and 742*b*; and 842*a* and 842*b*), define part of the boundary of the wheel air pressure system.

It is preferable to have low friction between the rotating wheel tire 11 (FIG. 5) and non-rotating hollow axle 30 (FIG. 4) so that the wheel spins easily. This is relevant to all wheel and axle combinations, and has particular importance to bicycle riders where muscle power supplies the energy needed to overcome friction and rolling resistance. Thus, the at least two dynamic seals (e.g., 642*a* and 642*b*; 742*a* and 742*b*; and 842*a* and 842*b*) allows the wheel assembly to rotate relative to the axle assembly, with a low coefficient of friction, or low rolling resistance, while maintaining the boundary between the wheel air pressure system and the external atmosphere.

It is apparent that other embodiments could be used to maintain an air-tight seal between the rotating wheel assembly and non-rotating axle assembly—as a non-limiting example—o-rings. Although it would be possible to use o-rings, there would be a strong frictional force exerted by the o-rings on the wheel assembly, increasing the rolling resistance and the coefficient of friction. However, o-rings or any other means for creating an air-tight seal between rotating and non-rotating parts may be used.

In another embodiment (FIG. 7), the relative weight of the system compared with the weight carrying capacity of the dynamic seal may be such that no wheel bearings are needed (not shown). In this embodiment, the at least two dynamic seals (742*a* and 742*b*) are sufficiently strong to support the weight of the system, thereby eliminating the need for a separate wheel bearing.

Returning now to FIG. 6, the rider can monitor and adjust the air pressure and air flow within the wheel air passageway, as described in this specification. The wheel air passageway includes the hollow axle 630 in the axle assembly. The hollow axle 630 is an annular axle with a hollow axle closed end 632 and a hollow axle open end 631, wherein the hollow axle open end 631 connects with air supply tubing 625. The open connection between the interior of the hollow axle 630 and the air supply tubing 625 allows air to flow between the air supply tubing 25 and the hollow space defined by the interior of the hollow axle. This is part of the wheel air pressure system, and forms part of the boundary of the wheel air passageway.

In other embodiments, any device or method may be used to connect the hollow axle 630 with the air supply tubing 625, as long as the connection is air-tight and the wheel air passageway is maintained.

The hollow axle 630 has at least one hollow axle hole 638 in the annular hollow axle, although any number of holes may be used. For purposes of this specification, when discussing a hollow axle hole it is understood to mean at least one hollow axle hole 638 in the hollow axle 630.

The hollow axle hole 638 in the annular hollow axle 630 allows air to flow between the inside of the hollow axle 630 and the exterior of the hollow axle 630, as part of the wheel air passageway. The hollow axle hole 638 is located longitudinally between the at least two static o-rings (e.g., 639*a* and 639*b*) which are on the outside circumference of the hollow axle 630, as shown in FIGS. 6 and 8.

A standard quick release hollow axle has a lever at one end, connected with a straight axle and axle sheath. In one embodiment of the invention, the hollow quick release axle may have the open end 631 of the hollow axle at a first end, and the quick release lever at a second end.

Referring to FIG. 4, the open end 31 of the hollow axle 30 is capable of connecting with the air supply tubing 625 that runs along the fork blades 12. In one embodiment, the hollow axle open end (31, not shown) may be connected with an axle air-port 37 that is connected with air supply tubing 25. The axle air-port 37 may be of any angle configuration, including a right-angle air port (i.e., 637 as in FIG. 6). The axle air-port 37 forms an air-tight connection between the hollow axle 30 and the air supply tubing 25 on the fork blade 12, and defines part of the boundary of the wheel air passageway and wheel air pressure system.

A wheel axle is generally horizontal and parallel with the surface upon which the wheel is moving. In the case of bicycles, the wheel axle is maintained in this position relative to the surface by fork blades connected with a bike frame, where the fork blades are essentially vertical to the surface, and at a right-angle to the wheel axle.

It is apparent that other devices can be used to maintain the wheel axle parallel to the surface, and other devices are used in motorcycles, cars and other vehicles. As a non-limiting example, some bicycles use a single fork blade to connect the wheel to the bicycle frame. As used in this specification, fork blades shall mean at least one fork blade, or any other device that holds a wheel axle parallel relative to the surface upon which the wheel is moving.

As shown in FIG. 4, the fork blades 12 are typically at a right angle to the wheel axle. Air supply tubing 25, forming part of the wheel air passageway, runs along a fork blade 12 and connects with the hollow axle 30. Because of the right-angle between the fork blade 12 and hollow axle 30, a right-angle air-tight fitting axle air-port 37 may be used to connect the wheel air passageway from the vertical fork blade 12 to the horizontal hollow axle 30. The wheel air passageway is maintained through the right-angle fitting axle air-port 37. A right-angle fitting configuration may be preferable because the air supply tubing 25 remains close to, or touching the fork blade, thus keeping a low profile for the air supply system.

In other embodiments, other angles or methods may be used to connect air supply tubing 25 to the hollow axle 30. Any angle or type of connection may be used, as long as air may flow between the air supply tubing 25 and the hollow axle 30 without leaking to atmosphere.

The axle sheath 33 is essentially a hollow annulus sized to receive the hollow axle 30. In one embodiment, the axle sheath 33 may be a single piece as shown in FIG. 6 (633).

In another embodiment, the axle sheath 33 may be comprised of at least two pieces. FIG. 8 shows a two-piece axle sheath comprised of an axle sheath body 833*a* and an axle sheath cap 833*b*. This may be a preferable embodiment for a front wheel. An axle sheath 833 made of a plurality of pieces may be desirable for manufacture and production reasons.

It is apparent that the number of pieces of the axle sheath 833 may be modified as desired, without affecting its function of sheathing the hollow axle 830.

As shown in FIGS. 6 and 8, the inner circumference of axle sheath (633, 833) in connected with at least two static o-rings (639*a* and *b*, 839*a* and *b*). The at least two static o-rings are on either side of the at least one hole (629, 829) in the annular body of the axle sheath (633, 833), where the axle sheath hole (629, 829) is located longitudinally between the at least two static o-rings (639*a* and *b*, 839*a* and *b*).

As with the hollow axle (630, 830), any number of holes may be used in the axle sheath (633, 833). For purposes of this specification, when discussing the axle sheath hole (629, 829) it is understood to mean at least one hole in the axle sheath (633, 833).

The hollow axle (630, 830) is sized to fit within the axle sheath (633,833) and the hollow axle (630, 830) has at least one hole (638, 838) longitudinally in between the at least two static o-rings (639*a* & *b*, 839*a* & *b*). When the hollow axle (630, 830) is inside the axle sheath (633,833) the at least two static o-rings (639*a*&*b*, 839*a*&*b*) are thus simultaneously connected with the outer circumference of the hollow axle (630, 830) and are correspondingly connected with the inside circumference of the axle sheath (633, 833). The hollow axle hole (638, 838) and the axle sheath hole (629, 829) are longitudinally between the at least two static o-rings (639*a* & *b*, 839*a* & *b*).

When the fork blades 12 are tightened against the hollow axle (630, 830), pressure is exerted on these at least two static o-rings (639*a* & *b*, 839*a* & *b*), causing them to expand into the empty space between the hollow axle (630, 830) and the axle sheath (633, 833) creating an air-tight seal, as part of the wheel air passageway.

The space created between the hollow axle (630, 830) and the axle sheath (633, 833) and the at least two static o-rings (639*a* & *b*, 839*a* & *b*) is the static interstitial space. The boundaries of this static interstitial space are the external circumference of the hollow axle (630, 830), the internal circumference of the axle sheath (633, 833) and at least two static o-rings (639*a* & *b*, 839*a* & *b*) between the hollow axle (630, 830) and the axle sheath (633, 833). The static interstitial space is part of the wheel air passageway.

Thus, both the hollow axle hole (638, 838) and the axle sheath hole (629,829) are longitudinally between the same at least two static o-rings (639*a* & *b*, 839*a* &*b*). The at least two static o-rings (639*a* & *b*, 839*a* &*b*) maintain the static air-tight seal in the static interstitial space, and are part of the boundary of the wheel air passageway, allowing compressed air to flow through the axle assembly, without leaking to the outside atmosphere.

The wheel air passageway includes, in part, the hollow axle (630, 830), the axle sheath (633, 833) and hub (640,840) with a hub air-port (641, 841) through which air may flow to air supply tubing (625, 825) connected with the wheel tire 11. Thus, air may flow in this wheel air passageway between the hollow axle (630, 830) and the hub (640, 840).

It is apparent that the hollow axle (630, 830) does not rotate, while the hub may or may not be rotating. Looking at FIGS. 6 and 8, if the hollow axle (630, 830) and hub (640, 840) are not rotating, the hub air-port (641, 841) and the axle sheath hole (638, 838) may not radially line up. Alternatively, if the hub is rotating, a single hub air-port (641, 841) will line up radially with a single axle sheath hole (638, 838) one time per wheel revolution. Therefore, it may be helpful to allow a greater air flow capacity from the hollow axle (630, 830) to the hub (640, 840). In one embodiment the hub inner circumference may have a radial trough (643, 843), in radial alignment with at least one axle sheath hole (629, 829), as shown in FIGS. 6 and 8. This configuration allows increased air flow between the axle sheath (633, 833) and the hub air-port (641, 841) when the hub is rotating.

Alternatively, the hub (640, 840) may have any other modification that allows greater air flow between the axle sheath hole (629), a dynamic interstitial space, and the hub air-port (641, 841).

The axle sheath (633, 833) is part of both the dynamic interstitial space and the static interstitial space. Its inner circumference is a boundary of the static interstitial space, and its outer circumference is a boundary of the dynamic interstitial space. In one embodiment (FIG. 8) the axle sheath (833) may have a radial trough (843), in radial alignment with at least one axle sheath hole (629).

Once the air passes through the axle sheath hole (629, 829), it enters the dynamic interstitial space. The boundaries of the dynamic interstitial space are the external circumference of the axle sheath (633, 833), the internal circumference of the hub (640, 840), and the at least two dynamic seals (642a & b, 842a & b) connecting the hub (640, 840) and axle sheath (633, 833). The at least two dynamic seals (642a & b, 842a & b) are positioned so that the axle sheath hole (629, 829) is longitudinally between the at least two dynamic seals (642a & b, 842a & b), as shown in FIGS. 6 and 8.

A dynamic seal is standard technology that allows the creation of an air-tight seal between non-rotating and rotating annular objects. The dynamic seal has an inner lip that is in air-tight connection with a first circumference, and an outer seal that is in air-tight connection with a second, wider circumference, allowing the second circumference to rotate relative to the first circumference.

In the present invention, the inner circumference, or inner lip (see FIG. 9, 642a1 & b1, 842a1 & b1), of the at least two dynamic seals (642a & b, 642a & b) rotates around the external circumference of the axle sheath (633, 833), forming a rotational air-tight connection between the inner lip of the dynamic seal and the outer circumference of the axle sheath (633, 833). The outer circumference of the at least two dynamic seals (642a & b, 842a & b) is in static air-tight connection with the inner circumference of the hub (640, 840).

The inner lip of the at least two dynamic seals (642a1, 842a1) provides an air-tight, dynamic radial connection with the axle sheath (633, 833). Likewise, the dynamic seal outer circumference remains in air-tight connection with the hub (640, 840). When the hub (640, 840) rotates, the at least two dynamic seals (642a & b, 842a & b) will also rotate around the non-rotating axle sheath (633, 833), because they remain in a fixed position relative to the hub. Thus, the at least two dynamic seals (642a & b, 842a & b) allow the creation of an air-tight space where air can pass from a non-rotating hollow axle assembly into the rotating wheel assembly, with relatively low friction. This is the dynamic interstitial space.

The at least two dynamic seals (642a & b, 842a & b) are part of the wheel air passageway, and define part of the boundary of the wheel air passageway between the non-rotating hollow axle assembly and the rotating wheel assembly.

Other means could be used to create an air-tight connection, as a non-limiting example, o-rings. But, it is preferable to have low friction between the rotating and non-rotating parts so that wheels spin easily. Thus, the at least two dynamic seal (642 a & b, 842 a & b) allows the wheel assembly to rotate relative to the hollow axle assembly, with a low coefficient of friction, or low rolling resistance, while maintaining an air-tight connection, and forming part of the boundary between the wheel air passageway and the atmosphere.

The inner circumference of the hub (640, 840) forms part of the boundary of the dynamic interstitial space. In one embodiment, the hub (640, 840) has an hub air-port (641, 841) that is in air-tight connection with the radial trough (643, 843). This hub air-port (641, 841) is located in alignment with the axle sheath hole (629, 829) (and radial trough 643, 843, if any) so that air flows between the axle sheath hole (629, 829), and the hub air-port (641, 841), as part of the wheel air passageway, as shown in FIGS. 6 and 8. The hub air-port (641, 841) is located so that it is in radial alignment with the axle sheath hole (629, 829) to create the wheel air passageway.

As the hub (640, 840) turns, the hub air-port (641, 841) may remain in longitudinal alignment with the radial trough (643, 841), or if there is no radial trough the hub air-port (641, 841) may come into radial alignment with the axle sheath hole (629, 829) as the hub (640, 840) rotates.

The hub air-port 41 is in air-tight connection with the wheel tire tube 11. One embodiment of this air-tight connection is air supply tubing 25, as shown in FIG. 5.

The dynamic interstitial space and the hub air-port 41, and the air supply tubing 25 are part of the wheel air passageway, and form part of its boundary.

FIG. 7 is a cross-sectional view of another embodiment of an air passageway system, without relying on a hollow axle as a component of an air-tight connection between the non-rotating and rotating components of the system. In this embodiment, the wheel air passageway runs between the air supply tubing 725, a non-rotating hub air-port 737, a dynamic seal gland 744, a hub channel 745 and a rotating hub air-port 741. As in the other embodiments, hub air-port 41 connects with air supply tubing 725 that runs to the wheel tire 11. The embodiment may comprise at least one wheel bearing between at least one adapter partially within a side opening of the hub and an inner circumference of the hub.

As shown in FIGS. 7 and 10, at least two dynamic seals (742a and 742b) are in air-tight radial connection with the external surface of the hub 740 and are axially and radially constrained within a dynamic seal gland 744. The at least two dynamic seals 742a and 742b maintain the air-tight radial connection between the dynamic seal gland 744 and the rotating hub body 740 within. The hub channel (745) has a first end (745a) in air flow connection with the at least two dynamic seals, and a second end (745b) in air flow connection with the hub air-port (741), so that the hub air-port connects the air-supply tubing 725 with the wheel tire 11.

The dynamic seal gland 744 may be guided by traditional ball bearings or plain bearing technology. The dynamic seal gland 744 and air supply tubing 725 do not rotate, while the hub 740 may rotate. The air supply tubing 725 may be held in place with additional assistance from a mechanical arm. Air is conveyed through the wheel air passageway from the fill-purge valve 22 (FIG. 2), through the air supply tubing 25, and the dynamic seal gland 744. The dynamic interstitial space resides between the dynamic seal gland 744, the at least two or more dynamic seals 742a and 742b, and the rotating hub 740. Air is then conveyed via one or more hub channels 745 within the hub 740 itself, to the hub air-port 741 and on to the air supply tubing 25.

The wheel air passageway 745 continues from the hub 740 to the wheel 11. Air supply tubing 25 runs between the hub air-port 741 and the tire 11, and thus the air supply tubing 25 has one end in air-tight connection with the hub air-port 741 and a second end in air-tight connection with the wheel tire 11. The wheel tire air connection, in one embodiment, may have an open-close valve 35 that separates the wheel tire 11 from the rest of the wheel air passageway, as shown in FIG. 5. When the open-close valve 35 is open, the wheel air passageway runs from the fill-purge valve 22 to the wheel tire 11. When this open-close valve 35 is closed, the wheel tire 11 is separated from the rest of the wheel air passageway. When the open-close valve 35 is manipulated to the closed position, the wheel air pressure system inside the wheel tire 11 is separated from, and closed off, from atmospheric pressure. Thus, when removing the wheel, it may be helpful to close the open-close valve 35 and thus maintain the wheel air pressure even though the wheel is no longer connected with the rest of the wheel pressure system.

When the rider disconnects the hollow axle 30 from the fork blades 12, the rider may disconnect the angled-fitting axle air-port 37 from the hollow axle 30. It is apparent that the air pressure within the wheel tire 11, and entire wheel passageway system is higher than atmospheric pressure. Thus, when the angled-fitting axle air-port 37 is disconnected from the hollow axle 30, air will flow from within the wheel air passageway to the lower atmospheric pressure. To prevent the wheel tire 11 from completely deflating to atmospheric pressure, it may be helpful to close off the wheel tire 11 from the outside atmosphere, and thereby maintain air pressure within the wheel tire 11. In one embodiment, an open-close valve 35 is used to either separate or connect the wheel tire to the atmospheric pressure.

It is apparent that the open-close valve 35 may be located anywhere between the hollow axle 30 and the wheel tire 11. For convenience, in one embodiment, the open-close valve 35 is located at the wheel tire side of the air supply tubing 25, as shown in FIG. 5. In this embodiment, the air supply tubing 25 connects the hub 40 to the wheel tire 11, and the open-close valve 35 is positioned at the wheel tire end of the air supply tubing 25. To remove the wheel tire 11 from the fork blades 12, the rider may manipulate the open-close valve 35 to the closed position, disconnect the angled fitting axle air-port 37 from the hollow axle 30, release the hollow axle 30 from the fork blades 12, and remove the wheel tire 11. Because the open-close valve 35 is "closed", the wheel tire 11 will maintain the air pressure of the wheel system, even when the wheel tire 11 is removed from the fork blades 12.

Bicycles frequently have wheels with an axle that is capable of removeably connecting to fork blades. A bike 10 typically has two fork blades 12 that descend from the fork crown. In a non-limiting typical configuration, each fork blade 12 has a slot or hole. The hollow axle 30 is connected with at least one adapter 15 that connects with the fork blade 12, so that the wheel tire 11 is between the two fork blades 12. Typically, each hollow axle 30 has two ends, and each end is typically fitted with at least one adapter (615a & b, 715a & b, 815 a & b), as shown in FIGS. 6, 7, and 8. The fork blades 12 are tightened toward each other, compressing against the at least one adapter (e.g., 615a or 615a), and thereby holding the wheel tire 11 to the fork blades 12 and the bike 10. The at least one adapter (e.g., 615a & b) removeably connects the hollow axle 30 with the fork blade 12 through standard technology, for example, a quick release system, or a standard nut and bolt system.

Standard quick release technology allows bike riders to quickly and easily remove bike wheels from the bike frame, by simply manipulating a lever on one end of the quick release axle. When a rider manipulates the lever in one direction the inward pressure on the fork blades increases, and when the bike rider manipulates the lever in the other direction, the inward pressure on the fork blades decreases. Increasing the inward pressure on the fork blades compresses the blades against the axle/adapter, and thus holds the wheel to the bike frame.

In one embodiment (FIG. 8), when using a quick release hollow axle 830, the wheel tire 11 fits between the two fork blades 812a and 812b, so that a first at least one adapter (815a) on the open end (831) of the hollow axle (830) is connected with a first fork blade (812a), and a second at least one adapter (815b) on the closed end (832) of the hollow axle (830) is connected with a second fork blade (812b).

In another embodiment (FIG. 6), the fork blades (612a, 612b) are compressed onto the at least two adapters (615a, 615b) by having a threaded end on the hollow axle (630), so the threaded end serves as a bolt. A nut (not shown) is tightened against the outside of the fork blade (612a or 612b), moving the fork blade toward the center, compressing against the hollow axle (630) and the at least one adapter (615a or 615b), and holding the wheel to the bike.

Figure 1:
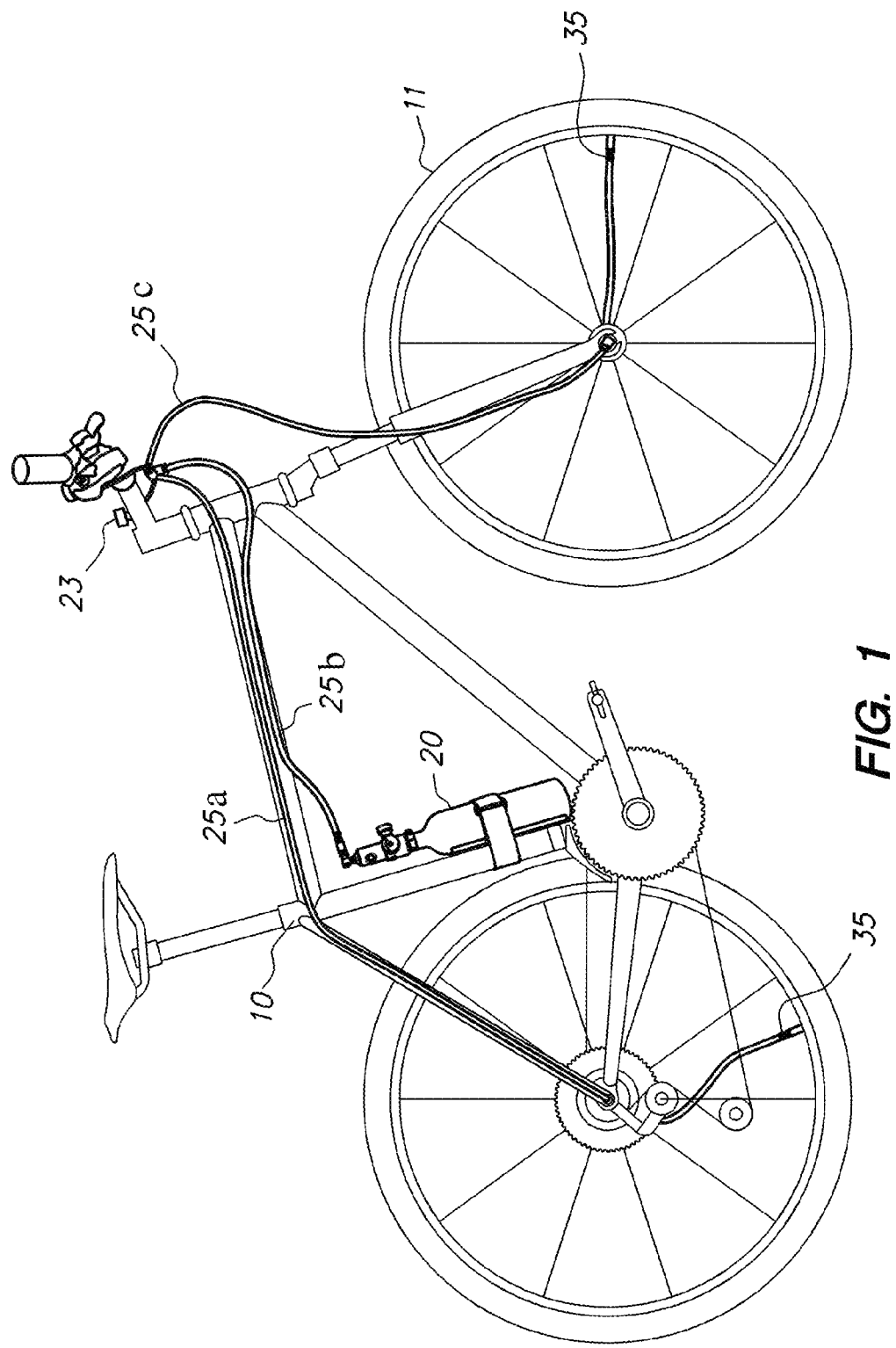
FIG. 1 is side view of one embodiment of the invention, on a two-wheeled vehicle.

In the present invention (FIGS. 6 and 8), the action of increasing the inward pressure on the fork blades (612a, 612b, 812a, 812b) to hold the wheel tire 11 to the bike frame 10 (FIG. 1) also puts pressure on the at least two static o-rings (e.g., 639a and 639b. As the fork blades (612a, 612b, 812a, 812b) are tightened inward, they exert pressure on the hollow axle 30 and the at least one adapter (615a, 615b, 815a, 815b), compressing the at least one adapter (615a, 615b, 815a, 815b) against the at least two static o-rings (639a and 639b, 839a and 839b) and forcing the at least two static o-rings (639a and 639b, 839a and 839b) inward against the hollow axle (630, 830) creating an air-tight seal.

Other embodiments may have a different number of forks, or a different configuration for connecting with the hollow axle 30. In these embodiments, the inward pressure used to removeably connect the wheel tire 11 will compress the at least two static o-rings (639a and 639b, 839a and 839b), and form an air-tight seal.

When a rider wants to increase the air pressure in a rotating tire, the rider will manipulate the fill-purge valve 22. Fill-purge valve 22 is a valve that allows compressed air to (1) to flow from the compressed air tank 20 into the wheel air pressure system, thereby increasing the wheel tire air pressure, or (2) to flow from the wheel tire air pressure system to the atmosphere, thereby decreasing the wheel tire air pressure, or (3) to separate the pressure in the wheel tire air pressure system from the compressed air tank 20 air pressure system and atmospheric pressure, thereby maintaining a constant wheel tire pressure.

In one embodiment (FIG. 2), there is one fill-purge valve 22 for each wheel tire 11. In this embodiment, manipulating one fill-purge valve 22 will thus change the air pressure in a single wheel tire. In another embodiment, there may be only one fill-purge valve 22 for all wheels. In this embodiment, manipulating the fill-purge valve 22 will adjust the air pressure in all wheels connected with the fill-purge valve 22.

In one embodiment, the fill-purge valve 22 is a three-position, three-port valve. When a rider manipulates the fill-purge valve 22 to the "fill" position compressed air flows from the compressed air tank 20 through air-supply tubing 25 to, in, and through the fill-purge valve 22, to air-supply tubing 25 that is ultimately connected with the wheel tire.

The compressed air is delivered from a compressed air tank 20 that is capable of supplying compressed air at pressures higher than the pressure desired inside the wheel tire. The compressed air tank 20 may be any compressed air tank 20 that can deliver compressed air at pressures that are higher than needed to inflate the wheel tire. The compressed air tank 20 may be removeably mounted anywhere on the bike or the rider's body that is convenient. In one embodiment, the compressed air tank 20 is removeably mounted to the bike frame at standard water bottle locations.

Bicycle tubes can range in air pressure, with maximum air pressures of over 140 pounds per square inch. Due to the laws of physics, compressed air will flow from spaces that have higher air pressure to spaces with lower air pressure. Thus, to inflate the wheel tire, compressed air must be delivered to the wheel tire at pressures that are higher than the desired tire inflation value.

The fill-purge valve 22 divides the air tank pressure system from the wheel tire pressure system. The air flows from higher pressure on the compressed air tank air pressure system side, through air supply tubing 25 to the fill-purge valve 22, and when the fill-purge valve 22 is set to "fill" air flows from this higher tank air pressure system, through the fill-purge valve 22 to the lower wheel tire air pressure system. The air pressure in the wheel tire air pressure system is essentially the same throughout the system, from the fill-purge valve 22 to the wheel tire itself, as there is an open connection through the wheel air passageway, allowing free air flow between these two points. Thus, the air may flow either from the fill-purge valve 22 toward the wheel tire 11, or from the wheel tire 11 toward the fill-purge valve 22, as required by the laws of physics to adjust the air pressure within the wheel tire system.

When the rider manipulates the fill-purge valve 22 to the "fill" position, air flows from the higher pressure compressed air tank system into the lower pressure wheel tire system. In one embodiment, the first bolus of air will proceed through from the fill-purge valve 22, through air-supply tubing 25 to the angled axle air port 37, into the hollow axle 30, through the hollow axle hole 38 into the static interstitial space through the axle sheath hole 29 into the dynamic interstitial space out the hub 40 and into air supply tubing 25 connected to the wheel tube stem 35 and wheel tire itself. Obviously, this air flow happens rapidly. The air pressure inside the wheel tire and corresponding wheel tire air pressure system will continue to increase as long as the fill-purge valve 22 is in the "fill" position.

Likewise, when the rider wants to decrease the air pressure in the wheel tire 11 and the wheel air passageway, the rider manipulates the fill-purge valve 22 to the "purge" position. The air pressure within the wheel tire 11 and wheel air passageway is higher than atmospheric pressure, and manipulating the fill-purge valve 22 to "purge" allows air to flow from the wheel tire 11 and wheel air passageway to the outside atmosphere. This has the effect of decreasing the air pressure in the wheel tire 11.

If the rider does not manipulate the fill-purge valve 22, the fill-purge valve 22 remains closed or off, and will block all air pressure systems from each other. The wheel tire air pressure system, the compressed air tank air pressure system, and the atmospheric pressure will all remain separate from each other when the fill-purge valve 22 is off, thus maintaining the bike tube air pressure at a constant level.

While riding the bike, and with the wheels in rotational motion, the rider may wish to change the air pressure in the bike tube. To accomplish this, the rider manipulates the fill-purge valve 22 to change the wheel tire air pressure. After or while manipulating the fill-purge valve 22, the rider may want to know the new level of air pressure within the wheel tire and wheel air passageway. One embodiment uses an air pressure gauge 23 to monitor the air pressure within the bike tube system.

The air pressure within the wheel tire system is essentially constant, and thus an air pressure gauge 23 measuring the air pressure may be located at any point within the bike tube system. For convenience as shown in FIG. 3, in one embodiment the air pressure gauge 23 is located in air supply tubing 25 near the bike handlebars 14. In this embodiment, the fill-purge valve 22 and the air pressure gauge 23 are both located near the handlebars 14, so that the rider can easily manipulate the fill-purge valve 22 while the hands remain on or near the handlebars. An air pressure gauge 23 positioned close to the handlebars is convenient because the rider can look down and read the air pressure gauge 23 to monitor the air pressure within the bike tube system.

Thus, while manipulating the fill-purge valve 22, the rider may simultaneously and continuously read the air pressure gauge 23 to monitor the changing air pressure within the wheel tube air passageway system. When the air pressure gauge 23 reads at the desired air pressure, the rider manipulates the fill-purge valve 22 to the "off" position, and the bike tube system and compressed air tank system are closed, and the air pressure within bike tube system remains constant. The air pressure within the bike tube system will be maintained at the new level when the fill-purge valve 22 is in the off position.

The invention may be embodied in other specific forms without departing from the spirit or essential characteristics thereof. For purposes of this specification, "air" and "gas" mean any compressed gas whether or not the media remains in gas form when compressed "Wheel tire" or "wheel tube" means an inflatable tire either with a tube, or without a tube as needed by the vehicle. The embodiments disclosed in this specification are to be considered in all respects as illustrative and not restrictive, and all changes that come within the meaning and range of equivalency of the claims are intended to be embraced therein.

What is claimed is:

1. A system for adjusting gas pressure in a wheel tire comprising:
    a compressed gas tank comprising compressed gas at a pressure higher than atmospheric pressure;
    a hollow axle with an open end and a closed end, at least one hollow axle hole and an outer circumference;
    a fill-purge valve in air flow connection with the compressed gas tank;
    an axle air-port in air flow connection with the fill-purge valve and with the open end of the hollow axle;
    an axle sheath having an inner circumference at least partially around the outer circumference of the hollow axle and having at least one axle sheath hole in air flow connection with the at least one hollow axle hole;
    at least two static o-rings between the axle sheath and the hollow axle, with the at least one axle sheath hole and the at least one hollow axle hole located between the at least two static o-rings;
    at least two dynamic seals each having a inner lip around an outer circumference of the axle sheath, with the at least one axle sheath hole and the at least one hollow axle hole located between the at least two dynamic seals;
    a hub having an inner circumference in air-tight connection with the at least two dynamic seals and having;
    a radial trough in the hub inner circumference, with the radial trough in air flow connection with the at least one axle sheath hole; and
    a hub air-port in air flow connection with the radial trough and with a wheel tire.

2. The system of claim 1, wherein air supply tubing provides the air flow connection.

3. The system of claim 1, wherein the hub air-port is a right-angle connection.

4. The system of claim 1, wherein the axle sheath comprises an axle sheath body and an axle sheath cap.

5. The system of claim 1, further comprising an air pressure gauge in air flow connection with an air supply tubing the fill-purge valve and the hollow axle.

6. The system of claim 1, further comprising at least two wheel bearings in rotational connection with an outer circumference of the axle sheath and the hub inner circumference.

7. The system of claim 1, further comprising a first at least one adapter adjacently connected with the open end of the hollow axle and a second at least one adapter adjacently connected with the closed end of the hollow axle with the axle sheath between the first at least one adapter and the second at least one adapter.

8. The system of claim 1, further comprising an open-close valve in air flow connection with the hub air-port.

9. The system of claim 1 wherein the axle sheath further comprises an inner circumference radial trough.

10. The system of claim 1 wherein the gas is selected from the group consisting of compressed air, carbon dioxide, and nitrogen.

11. A system for adjusting air pressure in a wheel tire comprising:
    a compressed gas tank comprising compressed gas at a pressure higher than atmospheric pressure;
    a non-rotating hub air-port in air flow connection with the compressed gas tank and with a non-rotating dynamic seal gland;
    at least two dynamic seals within the non-rotating dynamic seal gland in air flow connection with the non-rotating hub air-port;
    a hub channel in the hub, comprising a first end in air flow connection with the at least two dynamic seals, and a second end in air flow connection with
    a rotating hub air-port in air flow connection with a wheel tire.

12. The system of claim 11 further comprising at least one wheel bearing between at least one adapter partially within a side opening of the hub and an inner circumference of the hub.

13. The system of claim 11 wherein an inner lip on each of the at least two dynamic seals forms the air flow connection with the hub and non-rotating dynamic seal gland.

14. The system of claim 11 further comprising an open-close valve in air flow connection with the rotating hub air-port and a wheel tire.

15. The system of claim 11 further comprising an axle sheath and a non-hollow axle within a hollow portion of the hub.

16. A method of monitoring and adjusting air pressure in a wheel tire, comprising:
    monitoring a pressure gauge that measures pressure in a wheel tire;
    manipulating a fill-purge valve to transfer compressed gas through at least one hollow axle hole and through at least one axle sheath hole which are between at least two dynamic seals with each of the at least two dynamic seals having an inner lip around an outer circumference of an axle sheath which has an inner circumference at least partially around an outer circumference of a hollow axle with at least two static o-rings between the outer circumference of the hollow axle and an inner circumference of the axle sheath; and
    ceasing manipulation of the fill-purge valve when the pressure gauge is at a desired pressure.

\* \* \* \* \*